United States Patent
Frink et al.

(10) Patent No.: US 9,928,009 B1
(45) Date of Patent: Mar. 27, 2018

(54) HIGH DENSITY TAPE DRIVE SERVER DESIGN

(71) Applicant: Amazon Technologies, Inc., Seattle, WA (US)

(72) Inventors: Darin Lee Frink, Lake Tapps, WA (US); Paul David Franklin, Seattle, WA (US); James Caleb Kirschner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 14/869,726

(22) Filed: Sep. 29, 2015

(51) Int. Cl.
*G06F 15/16* (2006.01)
*G06F 3/06* (2006.01)

(52) U.S. Cl.
CPC ........... *G06F 3/0686* (2013.01); *G06F 3/067* (2013.01); *G06F 3/0617* (2013.01); *G06F 3/0631* (2013.01)

(58) Field of Classification Search
CPC .... G06F 3/0686; G06F 3/0617; G06F 3/0631; G06F 3/067
See application file for complete search history.

(56) References Cited

U.S. PATENT DOCUMENTS

| | | | |
|---|---|---|---|
| 4,331,306 A | 5/1982 | Epina et al. | |
| 5,014,141 A | 5/1991 | Gervais et al. | |
| 5,210,664 A | 5/1993 | Perona | |
| 5,212,772 A | 5/1993 | Masters | |
| 5,285,333 A | 2/1994 | Barr et al. | |
| 6,766,412 B2* | 7/2004 | Bolt | G06F 3/061 369/34.01 |
| 6,829,116 B1 | 12/2004 | Owens et al. | |
| 6,853,548 B2 | 2/2005 | Vanderheyden et al. | |
| 7,127,388 B2 | 10/2006 | Yates et al. | |
| 7,159,024 B2* | 1/2007 | Mitsuoka | G06F 3/0607 709/225 |
| 7,237,056 B2* | 6/2007 | Gold | G06F 3/0617 711/112 |
| 7,356,622 B2* | 4/2008 | Hattrup | G06F 3/0605 707/999.008 |
| 9,063,898 B1* | 6/2015 | Merchant | G06F 11/1469 |
| 9,081,506 B2 | 7/2015 | Ochi | |
| 9,195,402 B1* | 11/2015 | Hostetter | G06F 3/061 |
| 2002/0144048 A1* | 10/2002 | Bolt | G06F 3/061 711/4 |

(Continued)

OTHER PUBLICATIONS

Dell'Oca, L, "8 gems in Veeam Availability Suite v8. Part 6: Tape Server," http://www.veeam.com/blog/8-gems-in-veeam-availability-suite-v8-part-6-tape-server.html (Jan. 12, 2015).

(Continued)

*Primary Examiner* — Moustafa M Meky
(74) *Attorney, Agent, or Firm* — Klarquist Sparkman, LLP (57) ABSTRACT

An enclosure-based tape drive server, comprises an enclosure, a controller, a memory linked to the controller, a plurality of at least eight tape drives, a host bus adapter and a network controller. The controller is positioned within the enclosure. The at least eight tape drives are positioned within the enclosure, and each of the tape drives is accessible from a front side of the enclosure. The host bus adapter couples the plurality of tape drives to the controller. The network controller is connectible to a network to couple the server to the network.

19 Claims, 11 Drawing Sheets

(56) References Cited

U.S. PATENT DOCUMENTS

| | | |
|---|---|---|
| 2009/0254645 A1 | 10/2009 | Haustein et al. |
| 2014/0330817 A1 | 11/2014 | Eleftheriou et al. |
| 2015/0117174 A1 | 4/2015 | Alber et al. |
| 2016/0041915 A1* | 2/2016 | Hostetter ................ G06F 3/061 709/217 |

OTHER PUBLICATIONS

"HP Rack-mount Kits," http://www8.hp.com/h20195/v2/GetHTML.aspx?docname=c04154496 (Feb. 13, 2015).
"HP StorageWorks Rack-Mount Tape Drive Kits," QuickSpecs, 13 pages, DA-10854, Canada—Version 34 (Nov. 13, 2006).
"HP StorageWorks Ultrium SCSI Tape Drives—HP Ultrium SCSI Configuration," http://h20564.www2.hp.com/hpsc/doc/public/display?docId=emr_na-lpg50331 (downloaded Jul. 16, 2015).
HP StoreEver 3U Rack-mount Enclosure User Guide, 26 pages, HP Part No. 606411-012 (Sep. 2013).
Mellor, C., "Disk-pushers, get reel: Even GOOGLE relies on tape," The Register, http://www/theregister.co.uk/2013/09/25/the_state_of_tape/?page=2 (Sep. 25, 2013).
Meller, C., "Google reveals TAPE-TASTIC data centre in saucy vid," The Register, http://www.theregister.co.uk/2013/01/28/google_oracle/ (Jan. 28, 2013).
Partners Remarketing, Inc., "IBM 3590 Tape Subsystems," http://www.partnersremarketing.com/3590.htm (downloaded Jul. 15, 2015).

* cited by examiner

HIGH DENSITY TAPE DRIVE SERVER DESIGN

BACKGROUND

Organizations such as on-line retailers, Internet service providers, search providers, financial institutions, universities and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks.

Each server rack, in turn, includes many servers as well as associated computer equipment and computer components. Some known rack systems include 40 rack-mounted components.

One category of rack-mounted components addresses storage needs. Some servers include a number of mass storage devices in the form of hard disk drives (for example, eight or more hard disk drives) to provide adequate data storage. Typically, the hard disk drives for servers are of a standard, off-the-shelf type.

For some applications, however, tape drives are still desired because magnetic tape provides a preferred storage option in some circumstances. For example, tape storage can be more robust, especially for long term storage, more secure, less expensive to operate (in part due to lower energy use) and of equivalent capacity as competing disk drive storage technologies.

There is a need, however, to provide a tape drive server having a high density of tape drives that is easy to integrate among other components in a modern large scale-computing facility.

DETAILED DESCRIPTION

Described below are implementations of a tape drive server having multiple tape drives, such as eight or more tape drives, under the operation of a controller, such as a single controller, and configured for use as a component of a large scale computing facility. In some embodiments, the controller and the tape drives are housed together in a single enclosure. In some embodiments, the tape drive server is configured to be rack-mountable in a standard computer equipment rack.

Figure 1A:
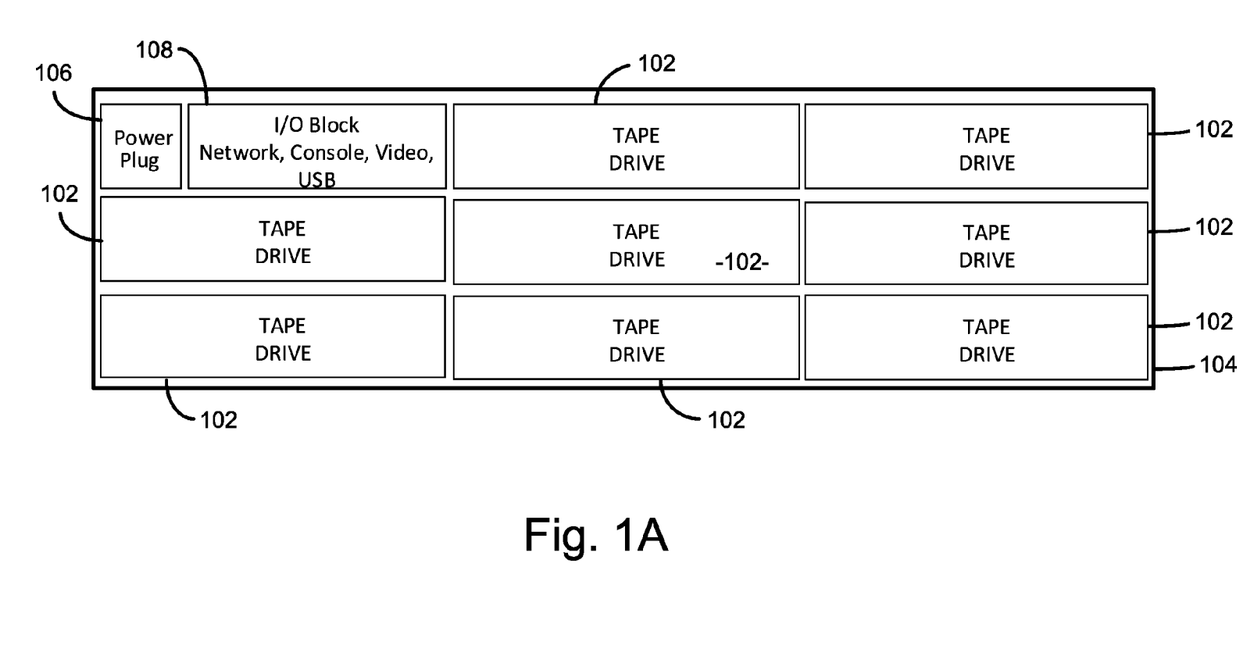
FIG. 1A is schematic front elevation view of a tape drive server having eight tape drives.

FIG. 1A is a schematic front elevation view of a rack-mountable tape drive server 100 having multiple tape drives, in this case, eight tape drives 102. The tape drive server 100 can be provided in a housing 104 as shown. In the illustrated implementation, the tape drive server 100 is configured as a typical server equipment rack component with a 3 U height and a standard component width, e.g., for a 19-inch rack or for a 23-inch rack. A 3 U height is a 3 rack unit height, where one rack unit (1 U) is defined as 1.75 inches. In this way, the tape drive server is widely adaptable, either for use as a single instance tape drive server or linked together with other tape drive servers in a tape drive server array.

As can be seen in FIG. 1A, each of the tape drives 102 is accessible from a front side of the tape drive server 100 when is installed in a standard server equipment rack. In addition to the eight tape drives 102, the server 100 also has a power plug 106 and an input/output block 108 that has multiple receptacles and ports to allow for multiple different connections to be established. In the illustrated implementation, there is a network connection (e.g., a 10 Gigabit Ethernet (GbE) connection), a console connection, a video connection and a USB connection, as just a few examples. A power switch or other control element (not shown) can be provided on the front side of the server 100. A reset switch or other control element (not shown) can also be provided on the front side of the server. Optionally, a diagnostic non-maskable interrupt (NMI) may be provided, such as behind a panel on the front side.

Advantageously, the tape drives 102 in the illustrated implementation have a standard configuration, which contributes to a lower overall cost for the server 100 and makes changing out tape drives 102 easier because standard tape drives are generally readily available. In the illustrated implementation, half-height drives are used to maximize the amount of tape storage per unit volume in the server 100, but the server could be adapted to use drives having a standard height or yet another configuration. One example of a suitable tape drive for the examples described herein is a LTO-6 half-height tape drive.

Figure 1B:
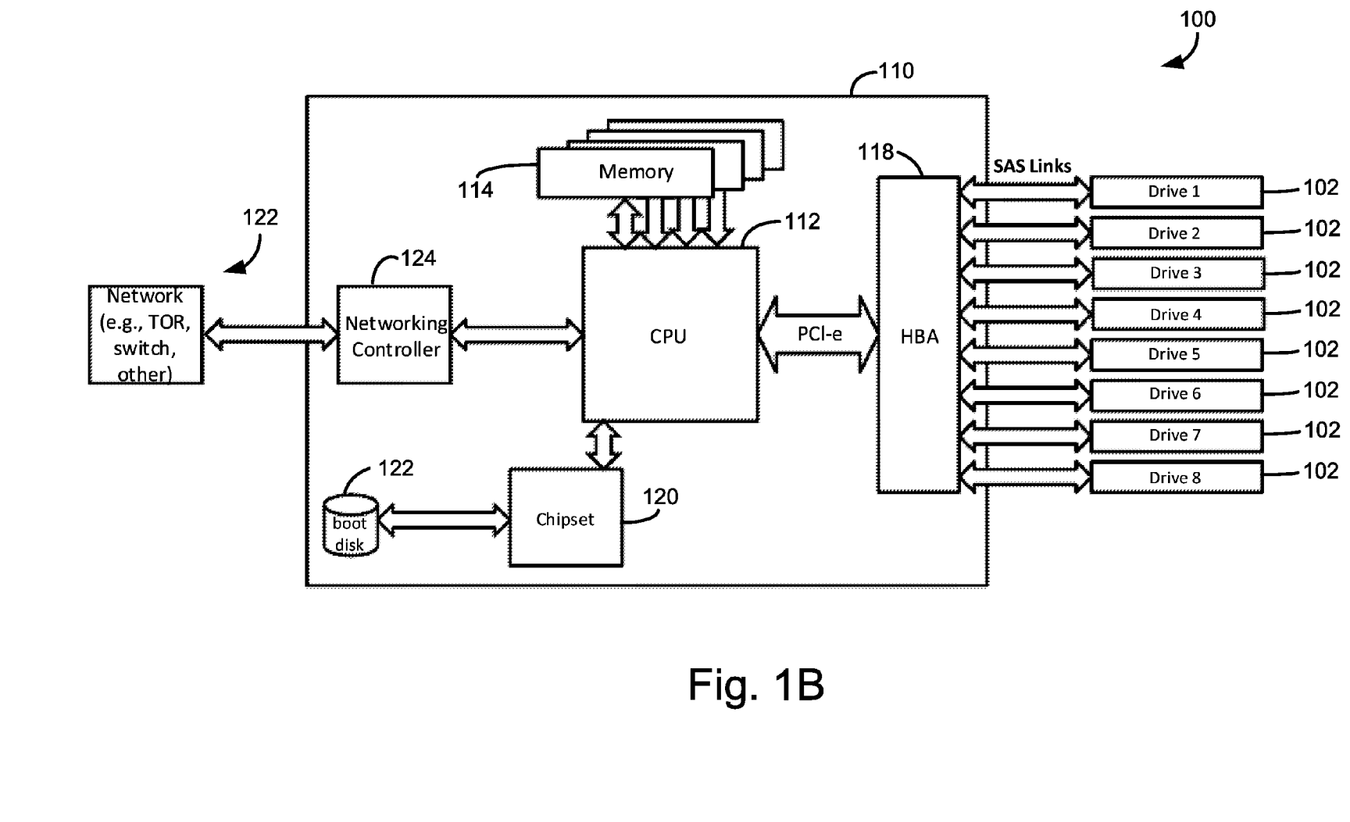
FIG. 1B is a block diagram of the tape drive server of FIG. 1A.

FIG. 1B is a schematic of the tape drive server, illustrating a motherboard 110 and showing connections between various components. A controller 112 is mounted to the motherboard 110 and is linked to memory 114, such as a local DRAM memory. One suitable controller is an Intel Xeon E5-2676 v3 2.4 Ghz CPU. The controller 112 is also linked to the tape drives 102, such as via a host bus adapter 118. As indicated, the host bus adapter 118 may be configured to use the PCI Express or PCIe (Peripheral Component Interconnect Express) high-speed serial computer expansion bus standard. In some implementations, a PCIe Gen 3 electrical interface is used to take advantage of speeds of up to 64 Gbps between the host bus adapter and the motherboard, or another suitable interface can be used. The host bus adapter 118 is preferably configured to permit a SAS link, such as a 6 G SAS link at 1.2 Mbps to each of the tape drives 102.

The controller 112 is also linked to a chipset 120, such as a Platform Controller Hub (PCH), which is in turn linked to a boot disk 122. The chipset 120 handles some of the controller functions and allows the tape drive server to be booted up.

The controller 112 is linked to a network controller 124, such as a network interface controller (NIC), which in turn allows the server to be connected to a network 122, such as to a TOR (Top of Rack) switch, other switch or other type of connection to the network 122 located outside of the tape drive server 100. Preferably, the network controller 124 is configured to enable at least a 10 GbE connection with the network 122.

As is described in further detail below, the various components of the server are advantageously selected to provide for a bandwidth managed system, e.g., managing networking input and output relative to storage input and output such that there are no "bottlenecks" in the system. In the example of the server 100, a balanced bandwidth managed system is achieved. Beginning with the tape drives 102, and assuming each tape drive is operated simultaneously in the same mode (i.e., in the write mode or in the read mode), and at full speed (1.28 Mbps), then eight tape drives can require as much as 9.6 Gbps of bandwidth, which can be accommodated by the eight SAS links as shown. Similarly, a PCIe Gen 3 connection between the host bus array 118 and the motherboard supports up to 64 Gbps of bandwidth, and thus is more than sufficient to accommodate the 9.6 Gbps maximum possible bandwidth required by the tape drives. A connection between the controller 112 and the network controller 124 supports 32 Gbps, and thus is more than sufficient to accommodate the 9.6 Mbps maximum possible bandwidth required by the drives. A network controller with a 10 GbE capability communicating to the network at 10 Gbps can accommodate the 9.6 Gbps maximum possible bandwidth required by the tape drives and achieve a balanced bandwidth matched system.

Figure 2A:
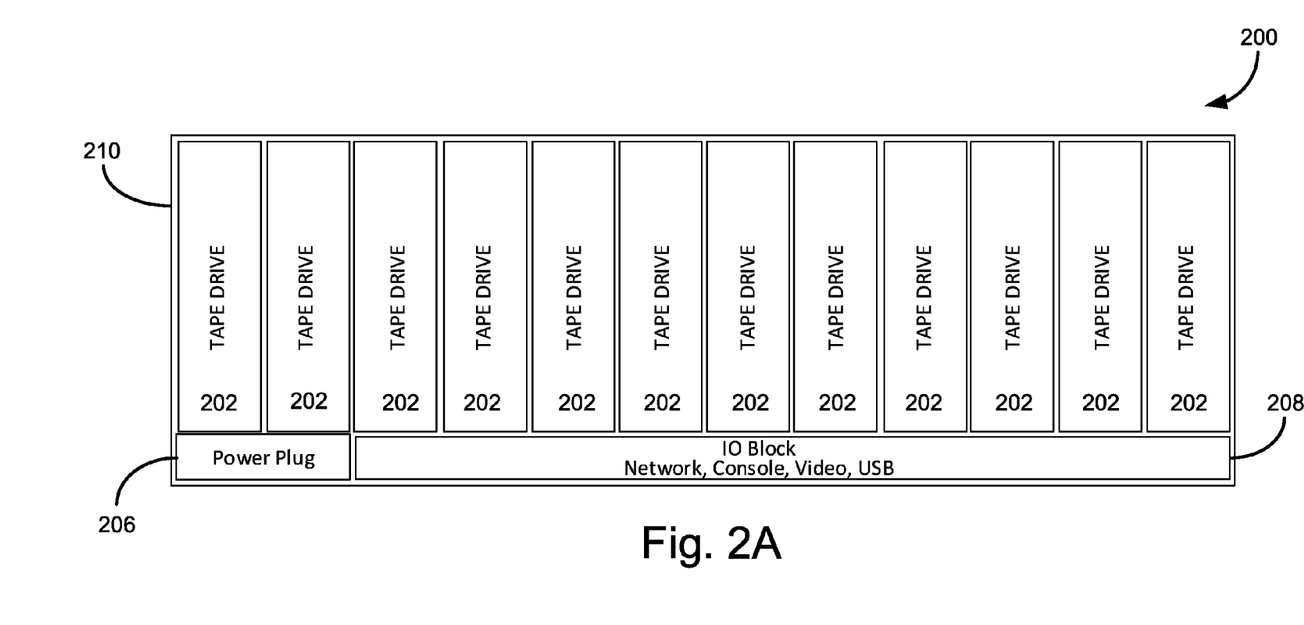
FIG. 2A is schematic front elevation view of a tape drive server having twelve tape drives.
Figure 2B:
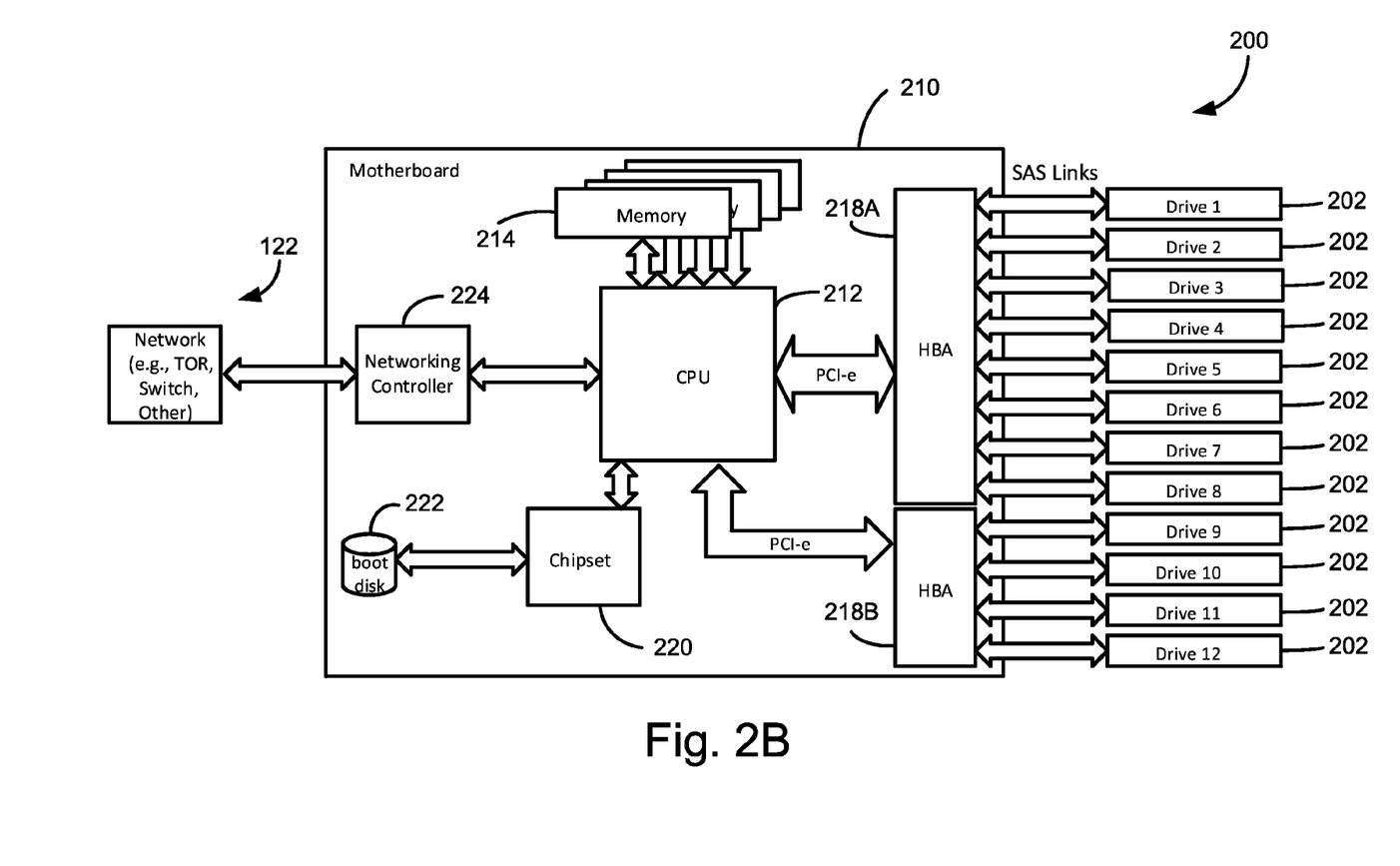
FIG. 2B is a block diagram of the tape drive server of FIG. 2A.

FIGS. 2A and 2B are similar to FIGS. 1A and 1B, respectively, but show a tape drive server 200 with twelve tape drives 202. Components that correspond to the components of FIGS. 1A and 1B have the same reference number plus 100. As shown in FIG. 2A, the tape drive server can have a 4 U height with the drives 202 positioned vertically as shown (instead of horizontally as shown in FIG. 1A) to effectively use the available area on a front side of the unit.

As shown in FIG. 2B, the components of the server 200 are generally similar to the components in the server 100, except that the host bus adapter's functions are carried out by two host bus adapters 218A and 218B. It would be equally possible to use a single host bus adapter having a larger capacity, or more than two host bus adapters having smaller capacities, depending, e.g., upon availability and cost considerations.

Similar to the server 100, the server 200 is configured by selecting components to achieve a bandwidth managed system. Unlike the server 100, however, the server 200 is not balanced in that there is insufficient capacity in the specific FIG. 2B implementation to allow for each of the twelve drives 202 to be run simultaneously in the same mode and at full speed. If this was done, the aggregate maximum possible bandwidth required for the drives 202 would be 14.4 Gbps. In some scenarios, and as discussed below in greater detail, there may be sufficient bandwidth to run all drives simultaneously, but if one portion of the drives was operating in one mode (e.g., writing), then the remaining portion of drives could only be operating in another mode (e.g., reading). In the FIG. 2B implementation, the connection between the host bus adapter 218A and the motherboard supports 64 Gbps, and the connection between the host bus adapter 218B and the motherboard supports 32 Gbps, so neither is limiting. Similarly, the connection between the controller 212 and the network controller 224 supports 32 Gbps, so this connection is also not limiting. But in the FIG. 2B implementation, the connection between the network controller 224 and the network 122 is a 10 GbE connection, so it does not support the maximum possible bandwidth of 14.4 Gbps required for the drives. Therefore, to achieve a bandwidth managed system in this oversubscribed scenario, the tape drives 202 are operated according to one or more programs that maintain their aggregate bandwidth demand at 10 Gbps or less at the connection between the network controller 224 and the network 122. As one example, the programs can specify that no more than some fraction, e.g., ⅔ or ½, of the drives are operated (in read mode, or in write mode) at any one time. Some provision for overhead is added, in addition to drive reading and drive writing requirements, e.g., for functions such as communicating control signals, updating software, etc.

Figure 3A:
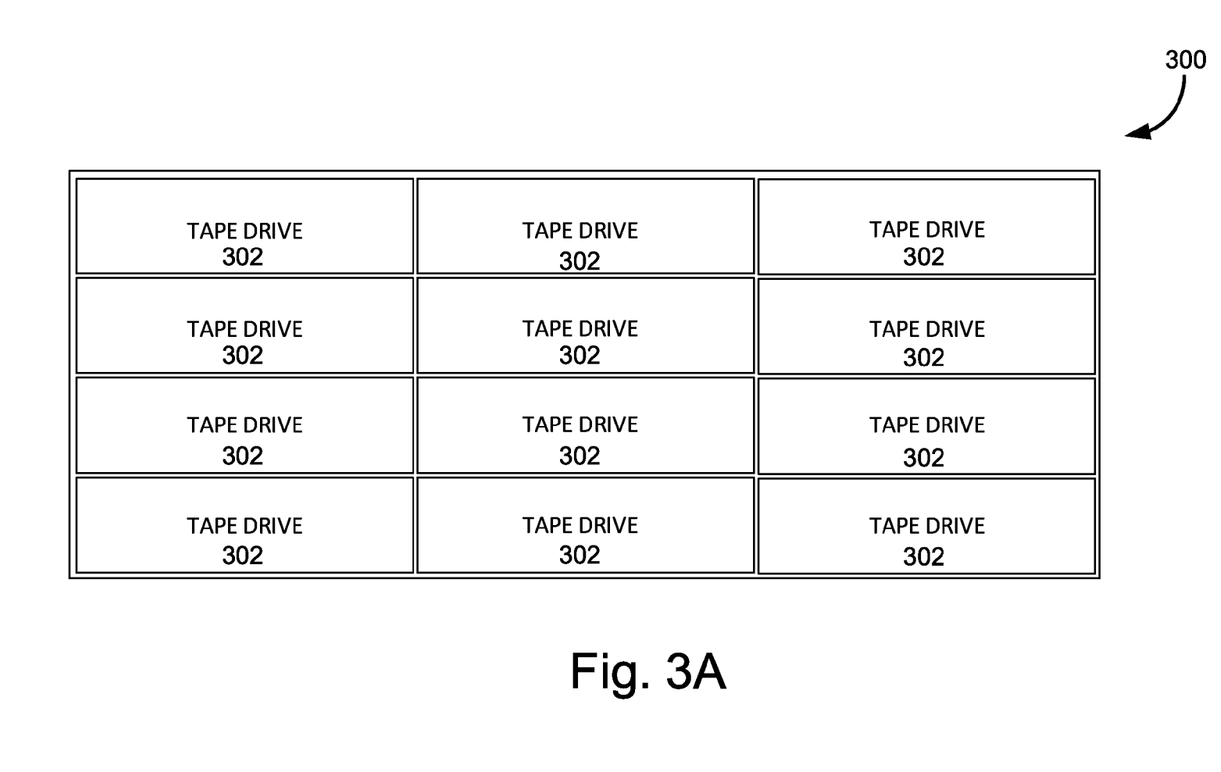
FIG. 3A is schematic front elevation view of a tape drive server having twelve tape drives in a different configuration.
Figure 3B:
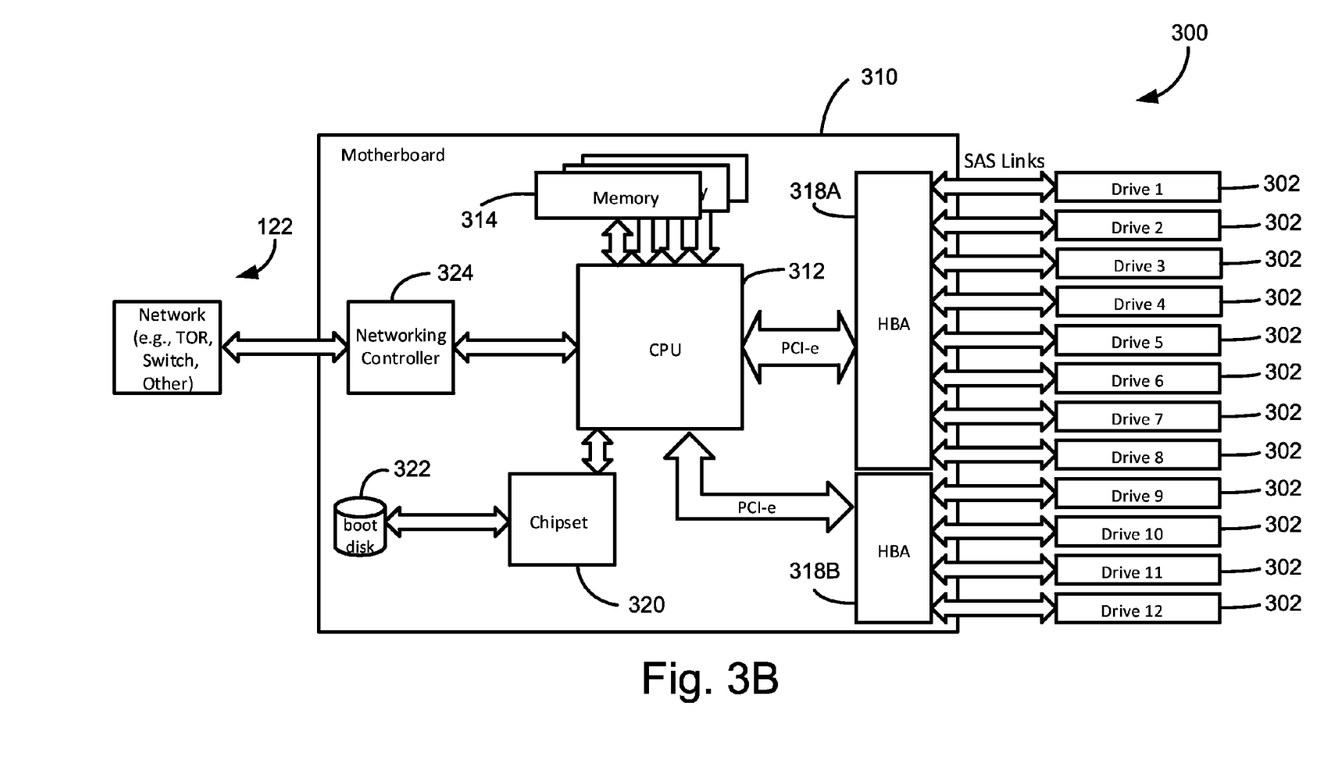
FIG. 3B is a block diagram of the tape drive server of FIG. 3A.

FIGS. 3A and 3B are similar to FIGS. 2A and 2B, respectively, but show a tape drive server 300 with twelve tape drives 302 where the input and output connections are located at a rear side of the server 300 (not shown), as opposed to being located at the front side as shown for the servers 100 and 200. Components that correspond to the components of FIGS. 2A and 2B have the same reference number plus 100. As shown in FIG. 3A, the tape drive server 300 can have a 4 U height with the drives 302 positioned horizontally in four rows to effectively use the available area on a front side of the unit.

The server 300 has components with the same capabilities as the server 200, and so the server 300 is bandwidth managed in the same way as the server 200.

Figure 4A:
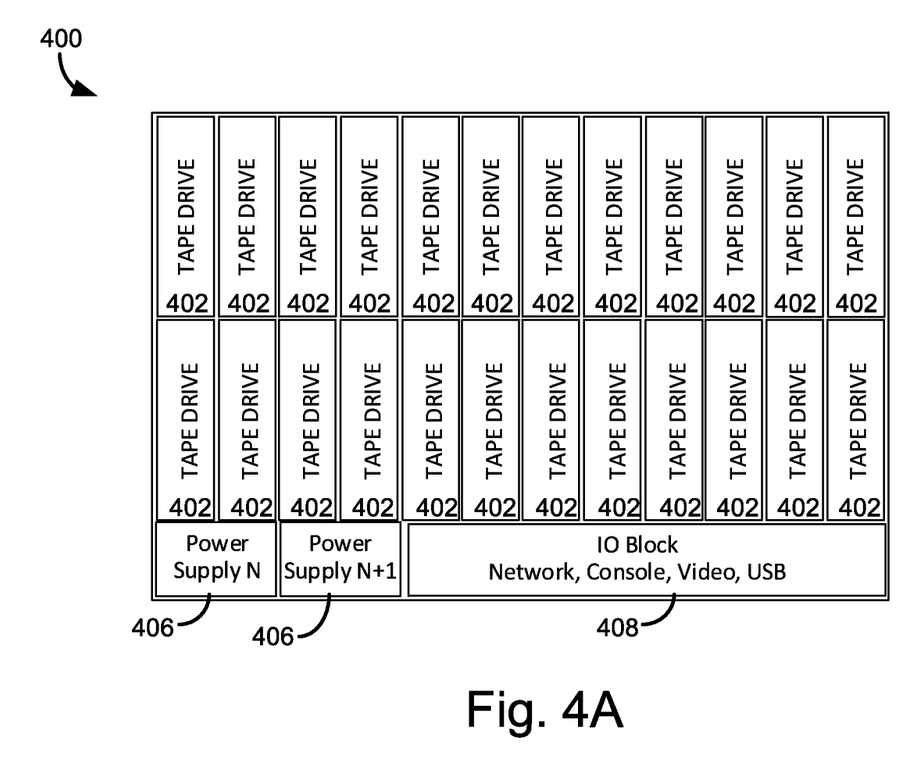
FIG. 4A is schematic front elevation view of a tape drive server having twenty-four tape drives.
Figure 4B:
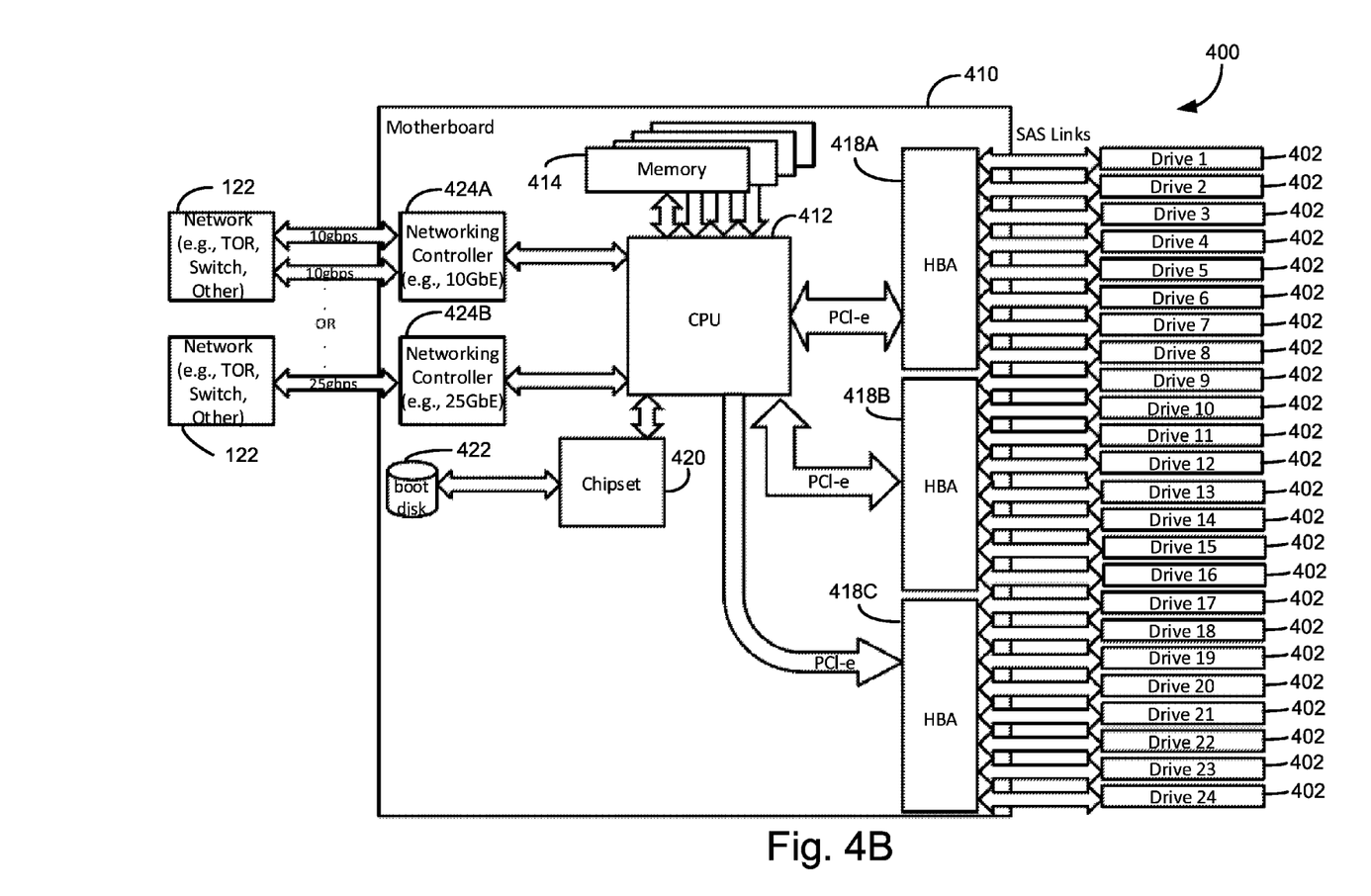
FIG. 4B is a block diagram of the tape drive server of FIG. 4A.

FIGS. 4A and 4B are similar to FIGS. 2A and 2B, respectively, but show a tape drive server 400 with twenty-four tape drives 402. Components that correspond to the components of FIGS. 1A and 1B have the same reference number plus 300. As shown in FIG. 4A, the tape drive server 400 can have an 8 U height with the drives 402 positioned vertically in two rows as shown to effectively use the available area on a front side of the unit. FIG. 4A also shows two power supply connections 406 for the tape drive server 400 as an example that any of the tape drive servers can be provided with more than one power supply, such as for redundancy.

As illustrated in FIG. 4B, the tape drive server 400 has three host bus adapters 418A, 418B and 418C. As also shown, the tape drive server 400 can have a 10 GbE network controller 424A to the network 122, with one or, as shown multiple 10 GbE connections, or it can have a 25 GbE network controller 424B with a 25 Gbps connection to the network 122 (in still other implementations, multiple network controllers in parallel are provided).

The aggregate maximum possible bandwidth to operate the 24 tape drives 402 simultaneously in the same mode and at full speed is 28.8 Gbps. Each of the three connections between the host bus adapters 418A, 418B and 418C and the motherboard, and the connection between the controller 412 and the network controller 424A or the network controller 424B, is sufficient to support the maximum possible 28.8 Gbps bandwidth required by the drives, but the connection to the network 122 from the network controller 424A at 10 Gbps (or at 20 Gbps, if two ports are used), or from the network controller 424B at 25 Gbps, is not sufficient, so the drives 402 must be operated according to one or more programs that maintain their aggregate bandwidth demand at or below the respective connection to the network. Alternatively, a connection to the network with increased bandwidth, or using multiple connections to the network concurrently (such as if the network controllers 424A and 424B are both present), can provide the additional bandwidth necessary to achieve a balanced bandwidth matched system.

Figure 5:
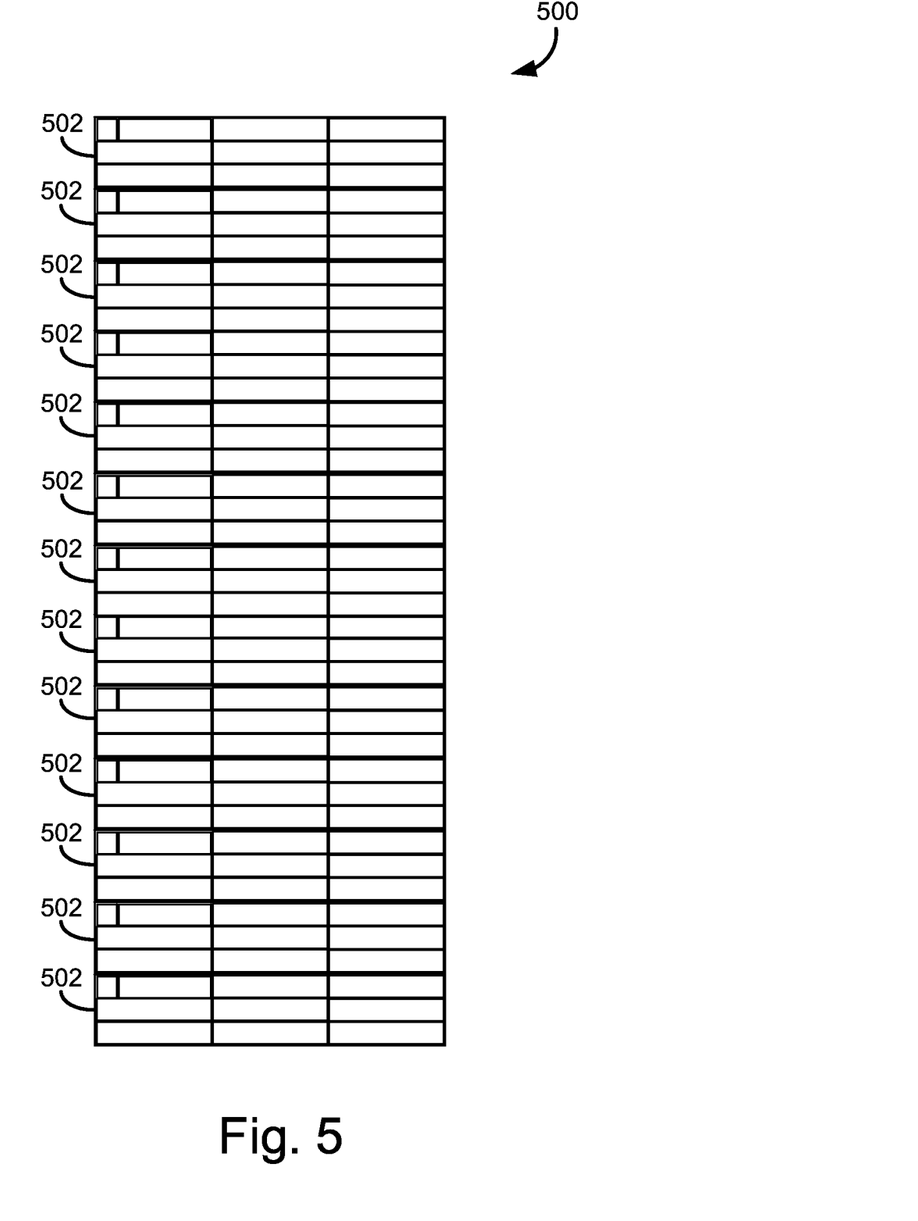
FIG. 5 is schematic front elevation view of a tape drive server having 104 tape drives.
Figure 6:
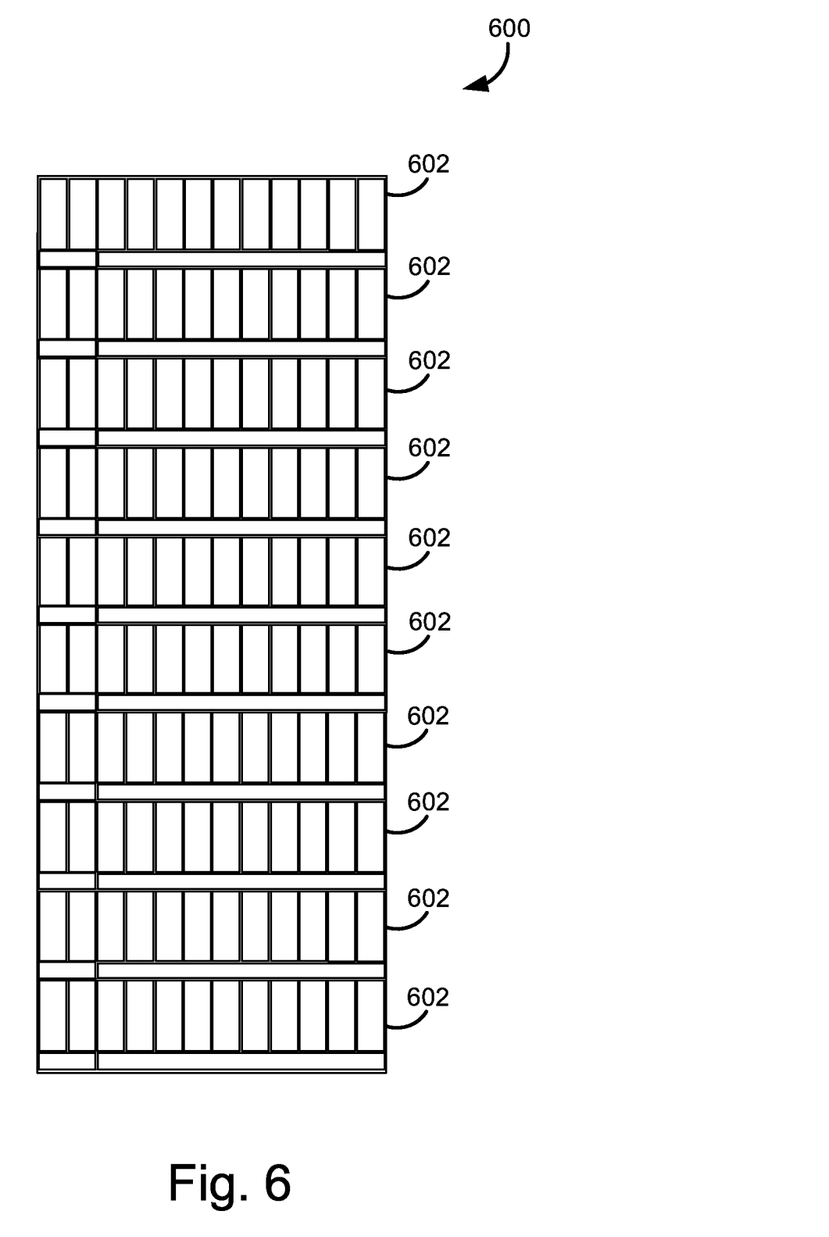
FIG. 6 is schematic front elevation view of a tape drive server having 120 tape drives.
Figure 7:
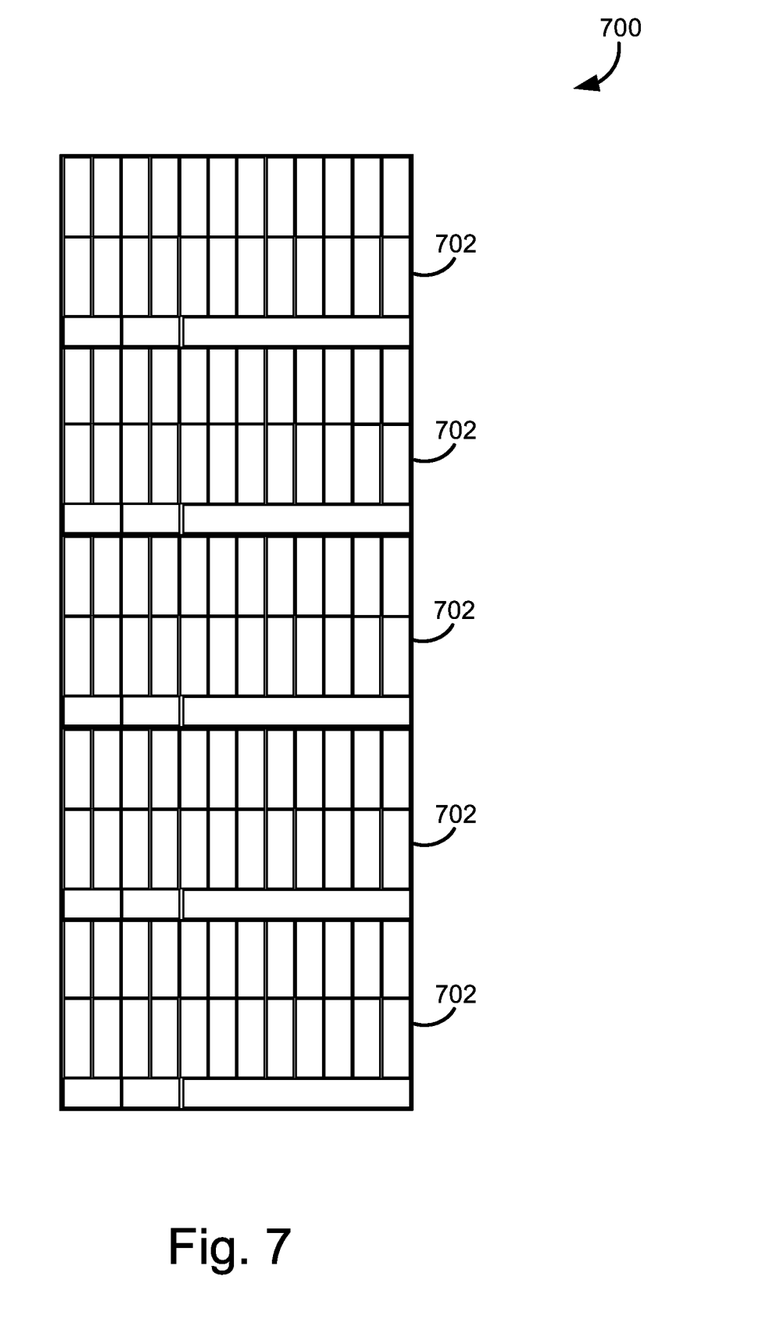
FIG. 7 is schematic front elevation view of a tape drive server having 120 tape drives according to a different configuration.

FIGS. 5, 6 and 7 are further examples of tape drive server arrays 500, 600, 700, respectively that are designed for the server rack equipment environment. FIG. 5 is a front side elevation view of the tape drive server array 500, which has 104 tape drives, one data switch and one console switch in a 42 U height, where the tape drives are provided in 13 3 U servers 502. Each of the servers 502 can be similar to the server 100 of FIG. 1A. FIG. 6 is a front side elevation view of the tape drive server array 600, which has 120 tape drives, one data switch and one console switch in a 42 U height, where the tape drives are provided in 10 4 U servers 602. Each of the servers 602 can be similar to the server 200 of FIG. 2A. FIG. 7 is a front side elevation view of the tape drive server array 700, which has 120 tape drives, one data switch and one console switch in a 42 U height, where the tape drives are arranged vertically in 5 8 U servers 702. Each of the servers 702 can be similar to the server 400 of FIG. 4A. In further embodiments, a rack contains combinations of different types and/or sizes of tape drive servers, and possibly other equipment (e.g., power equipment), as well.

As set forth herein, the tape drive server can be described as "standalone" in that there is a dedicated controller provided to operate the tape drives (as well as to carry out other server functions). The controller and the tape drives can also be described as integrated because they are purpose-matched and housed in the same component. In some implementations, the drive tape server is housed in a single rack-mountable enclosure, or attached to a common chassis, although other variations are also possible. For example, the tape drive server may be housed in a cabinet or in another storage structure.

The memory of the server (e.g., the memory 114, 214, 314 or 414) is used for normal, customary operation of the server and to act as a large buffer for data being transferred to or from the drives. The amount of memory needed for an adequate buffer will depend primarily on the quality of the network connection between the server and the source of the data. For example, if the data is accessed across the public intranet, significantly more memory would be required than if the data is on hard drives in a rack adjacent to the server and connected via a TOR. As a guideline, the memory can be sized such that each tape drive has an equal size buffer (it is thus very unlikely that any tape drive's buffer will run out of data to transfer to tape more than once while writing an entire tape). As another example, operations involving encrypting and/or decrypting data, or handling encrypted data, require more computing resources.

According to one mode of use, one or more of the tape drives of the tape drive server is regularly accessed so that a current tape can be removed and a new tape can be inserted. A current tape can be swapped when it is at full capacity, when a particular job or operation involving the tape is complete and/or when the tape has reached the end of its useful life, to name just a few reasons. Tapes may be swapped manually by an operator and/or by using a mechanized tape handling robot system.

In some implementations, the tape drive server may be configured for use with a file system interface. In other implementations, instructions identifying, e.g., a specific tape drive (or tape) and tape offset, and tape read and/or tape write commands are specified, which could be considered a "lower" form of interface. In still other implementations, an entire tape image may be pre-stored, and a reference to a location of this image is specified to the tape drive server.

In some modes of operation, all of the tape drives can be operated independently and simultaneously, and at full speed. In other modes of operation, the tape drives are operated according to different approaches, including operating fewer than all available tape drives, such as operating ⅔ to ¾ of all available tape drives in the same mode simultaneously. As also described above, it may be possible to operate the remaining drives or some portion thereof in another mode (e.g., a reading, writing or seeking mode).

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope of these claims.

The invention claimed is:

1. An enclosure-based tape drive server, comprising:
an enclosure;
a controller positioned within the enclosure;
a memory linked to the controller;
a plurality of at least eight tape drives positioned within the enclosure, wherein each of the tape drives is accessible from a front side of the enclosure;
a host bus adapter that couples the plurality of tape drives to the controller; and
a network controller connectible to a network to couple the server to the network, wherein the network controller's connection to the network is bandwidth managed relative to an aggregate maximum bandwidth required for the plurality of tape drives operating simultaneously and at full speed.

2. The enclosure-based tape drive server of claim 1, wherein the server is a balanced bandwidth managed system with the network controller's connection to the network exceeding the aggregate maximum bandwidth required for the plurality of tape drives.

3. The enclosure-based tape drive server of claim 1, wherein the plurality of tape drives comprises at least twelve tape drives.

4. The enclosure-based tape drive server of claim 1, wherein the server has a height adapted for a 3 U rack space.

5. The enclosure-based tape drive server of claim 1, wherein the memory has a capacity at least as great as a storage capacity of the tape drives.

6. The enclosure-based tape drive server of claim 1, wherein the network controller is configured for establishing a connection between the server and a top of rack switch of the network.

7. The enclosure-based tape drive server of claim 1, further comprising a power supply.

8. A tape drive server, comprising:
a controller;
at least eight tape drives coupled to the controller via a host bus adapter; and a connection from the controller to a network, wherein the controller, tape drives and the connection are bandwidth matched to permit at least a selected subset of the tape drives to be operated simultaneously and at full speed without exceeding a bandwidth of the controller, the host bus adapter or the connection from the controller to the network.

9. The tape drive server of claim 8, wherein the controller, the host bus adapter and the connection from the controller to the network are selected to achieve a balanced bandwidth matched system in which all of the tape drives can be operated simultaneously and at full speed.

10. The tape drive server of claim 8, further comprising a housing, and wherein the controller, the host bus adapter and the tape drives are positioned within the housing.

11. The tape drive server of claim 8, wherein the housing is rack-mountable in a standard server equipment rack.

12. The tape drive server of claim 8, wherein the controller programmed to operate fewer than all of the tape drives simultaneously.

13. The tape drive server of claim 8, further comprising a mother board, and wherein at least the controller is mounted to the mother board.

14. The tape drive server of claim 8, further comprising input and output connections.

15. The tape drive server of claim 8, further comprising a power supply.

16. The tape drive server of claim 8, wherein at least some of the plurality of tape drives are half height tape drives.

17. A tape drive server array, comprising:
a data switch;
a console switch; and
at least five tape drive servers, wherein the tape drive servers each comprise at least eight tape drives, each of the servers having a connection to the data switch that is bandwidth matched to the server's respective tape drives; and
wherein the data switch, the console switch and the tape drive servers are physically arranged in a common storage device.

18. The tape drive server array of claim 17, wherein at least a majority of the tape drives of each of the servers is accessible from one side of the common storage device.

19. The tape drive server array of claim 17 wherein the common storage device comprises a network equipment rack, and wherein the network switch, the console switch and the tape drive servers are arranged in the network equipment rack.

* * * * *